Figure 1:
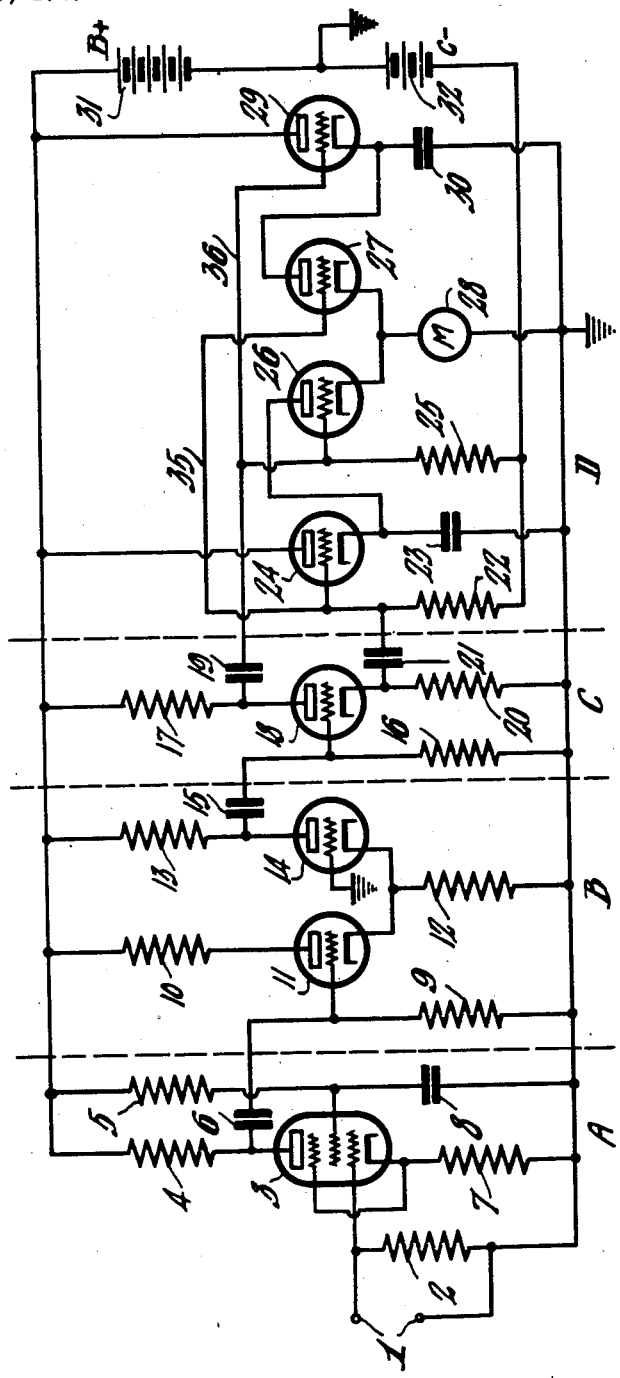

INVENTOR
Warren H. Bliss
BY H.S. Grover
ATTORNEY

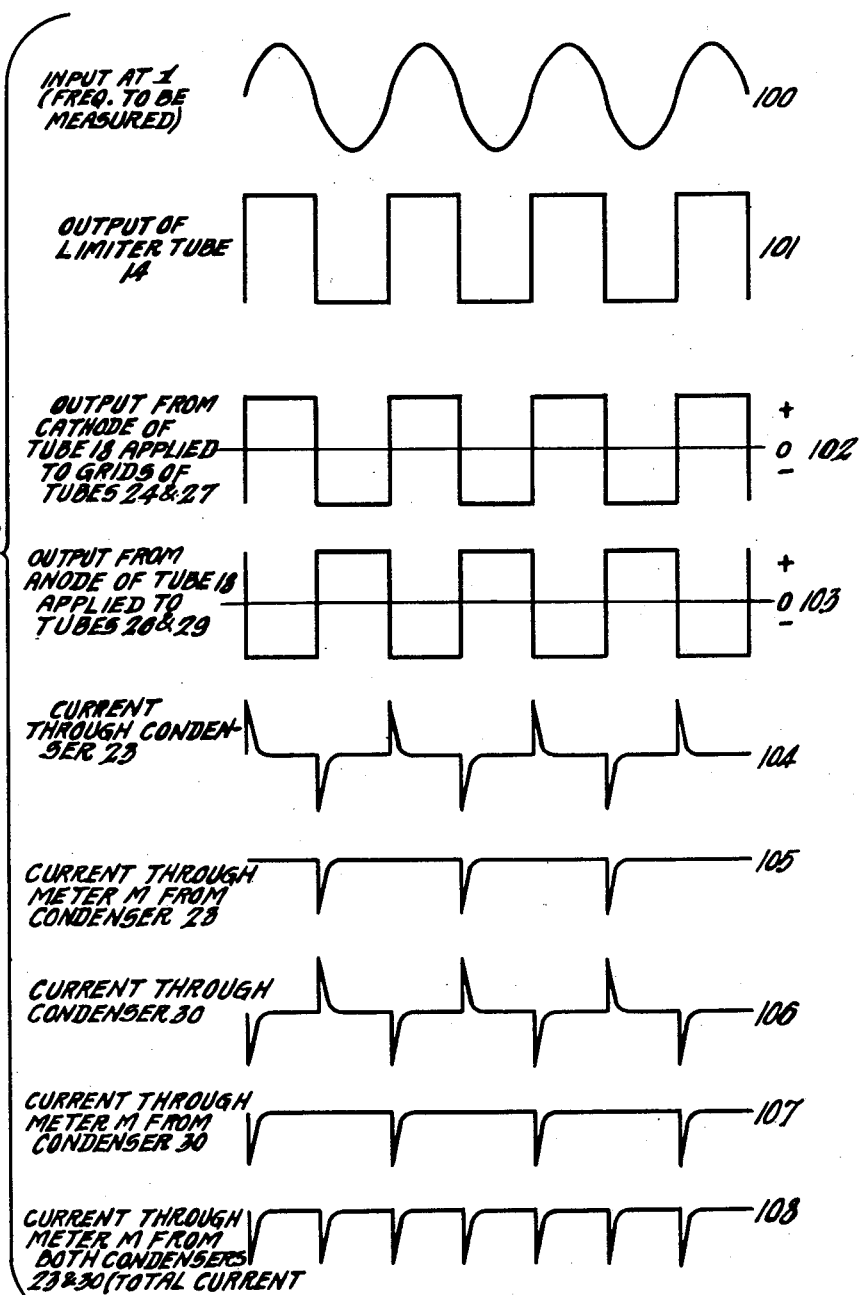

Patented Feb. 6, 1951

2,540,505

UNITED STATES PATENT OFFICE 2,540,505

ELECTRONIC FREQUENCY METER

Warren H. Bliss, Princeton, N. J., assignor to Radio Corporation of America, a corporation of Delaware Application April 18, 1946, Serial No. 662,977

4 Claims. (Cl. 175—368)

This invention relates to improvements in electronic frequency meters.

Briefly stated, the electronic frequency meter of the invention comprises a system for converting the waves of the frequency to be measured into essentially square and constant amplitude waves, and then utilizing the positive and negative half wave portions of the converted wave to produce an indication on a sensitive direct current meter.

An important feature of the invention comprises the electronic measuring circuit in which a pair of condensers are alternately charged from different portions of the applied square wave and alternately discharged through the indicating meter.

The following is a more detailed description of the invention in conjunction with a drawing wherein Fig. 1 diagrammatically illustrates one circuit embodiment of an electronic frequency meter in accordance with the present invention and Fig. 2 is a series of curves graphically illustrating the operation of the system of Fig. 1.

Referring to Fig. 1 in more detail, the electronic frequency meter comprises four sections designated A, B, C and D. The waves of the frequency to be measured are applied to input terminals 1, in turn, coupled to section A which constitutes an amplifier. The output of amplifier section A is applied to section B which constitutes an amplitude limiter device. The output of the amplitude limiter section B is applied to section C which constitutes a phase inverter and driver tube stage. The output of section C is applied to the frequency measuring circuit proper.

The amplifier section A comprises a pentode vacuum tube 3 having an input grid resistor 2, a cathode resistor 7, an anode resistor 4, a screen grid resistor 5, and a screen grid by-pass condenser 8. This amplifier section is a conventional circuit.

Output from the amplifier section 3 is supplied through coupling condenser 6 to the grid of the triode vacuum tube 11 of the limiter section B. This limiter section includes two triode vacuum tubes 11 and 14 having a common cathode resistor 12. Tube 11 has an input grid resistor 9 and an anode resistor 10. Tube 14 has an anode resistor 13 and a control grid which is directly connected to ground.

Output from the limiter section B is taken through coupling condenser 15 and applied to the grid of phase inverter and driver tube 18 of section C. This tube has an input grid resistor 16, an anode resistor 17, and a cathode resistor 20. It is preferred that resistors 17 and 20 be of equal value.

Output from the section C is taken from the anode of tube 18 through coupling condenser 19 and also from the cathode of tube 18 through coupling condenser 21.

The measuring circuit D comprises four triode vacuum tubes 24, 26, 27, 29; a pair of small condensers 23 and 30; and a direct current microammeter 28 preferably of the ballistic type. Tube 24 is the charge tube for condenser 23 while tube 26 is the discharge tube for condenser 23. Tube 29 is the charge tube for condenser 30, while tube 27 is the discharge tube for condenser 30. It should be noted that meter 28 is common to the cathode circuits of discharge tubes 26 and 27. The grid of charge tube 24 and the grid of discharge tube 27 are directly connected together through connection 35 and to the cathode output of tube 18 via coupling condenser 21. The grid of charge tube 29 and the grid of discharge tube 26 are directly connected together through connection 36 and to the anode output of tube 18 via coupling condenser 19. The charge tube 24 has an input grid resistor 22 while the discharge tube 26 has an input grid resistor 25. These resistors are, of course, common to the grids of tubes 27 and 29, respectively. It should be noted that the anodes of charge tubes 24 and 29 are directly connected to the positive terminal B+ of a source of unidirectional potential 31, such as a battery. This terminal B+ is also used to supply anode polarizing potential to the anodes of tubes 3, 11, 14 and 18 through their respective anode resistors. One terminal of each of the grid input resistors 22 and 25 is connected to the negative terminal C— of a source of unidirectional potential 32, such as another battery.

An explanation of the operation of the electronic frequency meter of Fig. 1 will now be given with reference to the curves of Fig. 2. The wave form whose frequency is to be measured is applied to the input terminals 1 for the amplifier stage 3. This input wave form may, by way of example, be a sine wave and is illustrated in curve 100 of Fig. 2. Amplifier 3 operates in conventional manner and provides an amplified output via a coupling condenser 6 to the amplitude limiter section B comprising vacuum tubes 11 and 14. The positive half waves applied to the grid of tube 11 cause this tube to draw current. When tube 11 draws current, there will be a flow of current through the common cathode resistor 12 which causes a bias to be applied to the tube 14, of such magnitude as to cut off conduction through tube 14. During the negative portions of the waves applied to the grid of tube 11, this tube will be cut off, as a result of which the cathode bias on tube 14 is reduced and there will be a normal flow of current through tube 14. This action results in a wave on the anode of tube 14 which is essentially square and of constant amplitude for all amplitudes and frequencies of input to the limiter over a wide range. The square wave output from the limiter section B is passed over coupling condenser 15 to the grid of the driver tube 18. Curve 101 of Fig. 2 shows the square wave-form of constant amplitude which is the output derived from the anode of limiter tube 14 via coupling condenser 15.

The positive portions of the square wave applied to the grid of tube 18 appear as positive half waves on the cathode of the tube 18 and as negative half waves on the anode of tube 18, and vice versa for the negative half waves applied to the grid of tube 18. It will thus be seen that the outputs from the cathode and anode of tube 18 via coupling condensers 21 and 19 are of opposite instantaneous polarity. A better understanding of this may be had by referring to Fig. 2, and comparing curve 101 with curves 102 and 103. Curve 102 shows the square wave form which appears on the cathode of tube 18, while curve 103 shows the square wave of inverted phase which appears on the anode of tube 18 at the same time.

The positive going portion of the square wave of curve 102 which is derived from the cathode of tube 18 and is applied to the grid of tube 24, causes tube 24 to draw current and rapidly charge condenser 23 to its full value. This charging current of the condenser 23 is indicated by the positive peaks of curve 104. Tube 24 is, therefore, a charging tube for condenser 23. During the application of the positive portion of the square wave to the grid of tube 24, there is applied to the grid of tube 26 from the anode of tube 18 through coupling condenser 19, the negative going portion of the square wave of curve 103. This negative portion is of sufficient magnitude to bias tube 26 beyond cut off. While tube 26 is biased beyond cut off, it prevents the discharge of condenser 23 through this tube. When the negative portion or second half of the square wave from the cathode of tube 18 (note curve 102) is applied to the grid of tube 24, this tube 24 will be biased beyond cut off. During the application of this negative portion to the grid of tube 24, there will be a corresponding positive portion or second half wave (note curve 103) applied from the anode of tube 18 to the grid of tube 26 of such magnitude as to cause this last tube to suddenly conduct. When tube 26 conducts, it enables condenser 23 to discharge through this tube and through sensitive direct current meter 28 to ground. It should be noted that the anode of tube 26 obtains its positive polarizing potential from the charge on condenser 23. The discharge of the condenser 23 through tube 26 and meter 28 is represented by the negative peaked portions of curve 104, while the charge of the condenser 23 through tube 24 is represented by the positive peaked portions of curve 104. The corresponding impulses of current through the meter M, when condenser 23 discharges, is graphically illustrated by curve 105.

The foregoing action is repeated for each cycle of the wave of unknown frequency applied to the input terminals 1, as a result of which meter 28 receives a succession of pulses of current of like polarity. Since meter 28 is an indicating meter of the ballistic type (sensitive D. C. microammeter) it gives an indication of the average current through the meter, and this average current is proportional to the number of pulses applied to the meter. The deflection of the meter will then be proportional to the frequency of the pulses passing therethrough.

In order to increase the sensitivity of the deflection of the meter 28, there are provided tubes 27 and 29 and condenser 30 which operate to produce a second set of pulses for meter 28. Tube 27 is a discharge tube for condenser 30 and has its grid connected to the grid of tube 24 via connection 35. Tube 29 is a charge tube for condenser 30 and has its grid connected to the grid of tube 26 via connection 36. It will thus be seen that condenser 30 charges through tube 29 while condenser 23 is discharging through tube 26, and that condenser 30 is discharging through tube 27 while condenser 23 is charged through tube 24. Curve 106 of Fig. 2 indicates the charge and discharge of current pulses through condenser 30. It should be noted that curve 106 is the inverse of curve 104. Curve 107 indicates the current pulses through the meter 28 from condenser 30. The current pulses of curve 107 occur at intervals between the current pulses of curve 105. Curve 108 indicates the total current through the meter 28, which comprises the current pulses from both condensers 23 and 30.

At this time it should be observed that condensers 23 and 30 have such values that the time of charge and discharge of these condensers is small compared to the period of the frequency of the waves being measured. The meter 28 has such inertia that it does not fall back appreciably between pulses and thus provides a steady indication or a deflection which is indicative of the average current of the pulses passing through the meter, in turn proportional to the number of pulses or cycles per second of the waves applied to terminals 1.

What is claimed is:

1. In a frequency metering system, means for producing two series of simultaneously occurring square waves of constant amplitude, the square waves of one series being of opposite instantaneous polarity to the square waves of the other series, first and second vacuum tubes each having a grid, a cathode and an anode, a source of anode polarizing potential connected to the anode of said first tube, means for supplying one series of said square waves to the grid of said first tube and the other series to the grid of said second tube, whereby one tube is rendered conductive and the other tube rendered non-conductive at the same time, and vice versa, a condenser connected in the cathode circuit of said first tube, a direct connection from the cathode end of said condenser to the anode of said second tube, a direct current meter in the cathode circuit of said second tube, said condenser being rapidly charged when said first tube is conductive and rapidly discharged through said meter when said second tube is conductive, said condenser having such value that the time of charge and discharge is small compared to the period of the frequency being measured, said meter providing a reading which is indicative of the average current flow produced by the pulses through said meter.

2. A frequency measuring system comprising a source of square waves of constant amplitude, an electron discharge device having an anode, a cathode and a grid, a connection from said grid to said source, output connections from said cathode and anode for obtaining therefrom two similar series of simultaneously occurring square waves, the waves of one series being inverted relative to the waves of the other series, first and second vacuum tubes each having a grid, a cathode and an anode, a source of anode polarizing potential connected to the anode of said first tube, means for supplying one series of said square waves to the grid of said first tube and the other series to the grid of said second tube, whereby one tube is rendered conductive and the other tube rendered non-conductive at the same time, and vice versa, a condenser connected in the cathode circuit of said first tube, a direct connection from the cathode end of said condenser to the anode of said second tube, a direct current meter in the cathode circuit of said second tube, said condenser being rapidly charged when said first tube is conductive and rapidly discharged through said meter when said second tube is conductive, said condenser having such value that the time of charge and discharge is small compared to the period of the frequency being measured, said meter providing a reading which is indicative of the average current flow produced by the pulses through said meter.

3. A measuring system comprising first and second electron discharge devices each having an anode, a grid and a cathode, means for supplying the anode of said first device with a positive polarizing potential relative to ground and for supplying the grids of said first and second devices with negative potentials relative to ground, a direct connection from the cathode of said first device to the anode of said second device, a meter coupled between the cathode of said second device and ground, a condenser coupled between the cathode of said first device and ground, and means for alternately causing said first and second devices to become conductive, whereby said condenser is charged through said first device and discharged through said second device in series with said meter, the time of charge and discharge of said condenser being small compared to the time of each cycle of operations, third and fourth electron discharge devices each having an anode, a grid and a cathode, a direct connection between the cathode of said fourth device and the cathode of said second device, whereby said meter is in the common cathode circuit of both said last devices, a direct connection from the grid of said fourth device to the grid of said first device, a direct connection from the anode of said fourth device to the cathode of said third device, a direct connection from the grid of said third device to the grid of said second device, a connection for supplying the anode of said third device with a positive polarizing potential relative to ground, and a condenser coupled between the cathode of said third device and ground, said last condenser being charged through said third device and discharged through said fourth device in series with said meter, both of said condensers having substantially the same value, said first and fourth devices becoming conductive when said second and third devices respectively become non-conductive, and vice versa.

4. A frequency measuring system comprising an amplifier of the waves whose frequency is to be measured, an amplitude limiter coupled to the output of said amplifier, a coupling tube having a grid coupled to the output of said limiter, said tube also having an anode circuit and a cathode circuit, first and second electron discharge device vacuum tubes each having an anode, a grid and a cathode, means for supplying the anode of said first tube with a positive polarizing potential relative to ground and for supplying the grids of said first and second tubes with negative potentials relative to ground, a direct connection from the cathode of said first tube to the anode of said second tube, a condenser connected between the cathode of said first tube and ground, a meter coupled between the cathode of said second tube and ground, a connection from the anode circuit of said coupling tube to the grid of said second tube, and a connection from the cathode circuit of said coupling tube to the grid of said first tube, whereby said vacuum tubes are alternately conductive and said condenser charges through said first tube and discharges through said second tube in series with said meter.

WARREN H. BLISS.

REFERENCES CITED

The following references are of record in the file of this patent:

UNITED STATES PATENTS

| Number | Name | Date |
|---|---|---|
| 2,026,421 | Fecker | Dec. 31, 1935 |
| 2,110,015 | Fitzgerald | Mar. 1, 1938 |
| 2,119,389 | Hunt | May 31, 1938 |
| 2,325,927 | Wilbur | Apr. 3, 1943 |
| 2,352,082 | De Rosa | June 20, 1944 |